US006585154B1

(12) United States Patent
Ostrover et al.

(10) Patent No.: US 6,585,154 B1
(45) Date of Patent: Jul. 1, 2003

(54) SYSTEM, METHOD AND DEVICES FOR DOCUMENTS WITH ELECTRONIC COPIES ATTACHED THERETO

(75) Inventors: Yaakov Ostrover, Gordon St. 51, Netanya 42442 (IL); Zvi Lavi, Rishon Le Zion (IL)

(73) Assignee: Yaakov Ostrover, Netanya (IL)

( * ) Notice: Subject to any disclaimer, the term of this patent is extended or adjusted under 35 U.S.C. 154(b) by 315 days.

(21) Appl. No.: 09/632,168

(22) Filed: Aug. 3, 2000

(51) Int. Cl.$^7$ ................................................. G06F 17/00
(52) U.S. Cl. ................... 235/375; 235/462.01; 235/494
(58) Field of Search ............................ 235/375, 462.01, 235/494

(56) References Cited

U.S. PATENT DOCUMENTS

| | | | | |
|---|---|---|---|---|
| 5,033,623 A | * | 7/1991 | Grecksch et al. | 209/3.3 |
| 5,294,792 A | * | 3/1994 | Lewis et al. | 250/221 |
| 5,490,217 A | * | 2/1996 | Wang et al. | 380/51 |
| 5,576,936 A | * | 11/1996 | Brorby | 174/17 R |
| 5,621,200 A | | 4/1997 | Irwin, Jr. et al. | |
| 5,682,143 A | * | 10/1997 | Brady et al. | 340/572.7 |
| 5,848,426 A | * | 12/1998 | Wang et al. | 715/505 |
| 5,903,869 A | | 5/1999 | Jacobson et al. | |
| 5,936,527 A | | 8/1999 | Isaacman et al. | |
| 6,053,405 A | | 4/2000 | Irwin, Jr. et al. | |
| 6,127,928 A | * | 10/2000 | Issacman et al. | 340/10.1 |
| 6,206,292 B1 | * | 3/2001 | Robertz et al. | 235/488 |
| 6,215,401 B1 | * | 4/2001 | Brady et al. | 340/572.7 |
| 6,304,416 B1 | * | 10/2001 | McAllister et al. | 360/132 |
| 6,318,633 B1 | * | 11/2001 | Drexler | 235/454 |
| 6,379,742 B1 | * | 4/2002 | Behm et al. | 427/261 |

FOREIGN PATENT DOCUMENTS

| | | | |
|---|---|---|---|
| JP | 401142819 A | * | 11/1987 |
| JP | 02002032704 A | * | 1/2002 |
| WO | WO 97/33252 | | 3/1997 |

* cited by examiner

Primary Examiner—Karl D. Frech
Assistant Examiner—Allyson Sanders
(74) Attorney, Agent, or Firm—Mark M. Friedman

(57) ABSTRACT

A system, method and devices for documents with electronic copies attached thereto. The system includes a microchip memory device affixable to a document and a chip loading device capable of placing electronic data in the microchip memory device. The method includes the step of storing electronic data in a microchip memory device affixable to a document. Further disclosed are a writing surface containing a microchip memory device, a chip reading device for reading a microchip memory device, and a chip loading device for placing electronic data in a microchip memory device. In some cases the devices of the invention are integrated into a machine such as a computer, a personal digital assistant, a telephone, a photocopy machine, a scanner, a printer or a fax machine in order to provide added utility to that machine.

11 Claims, 2 Drawing Sheets

Figure 1    60
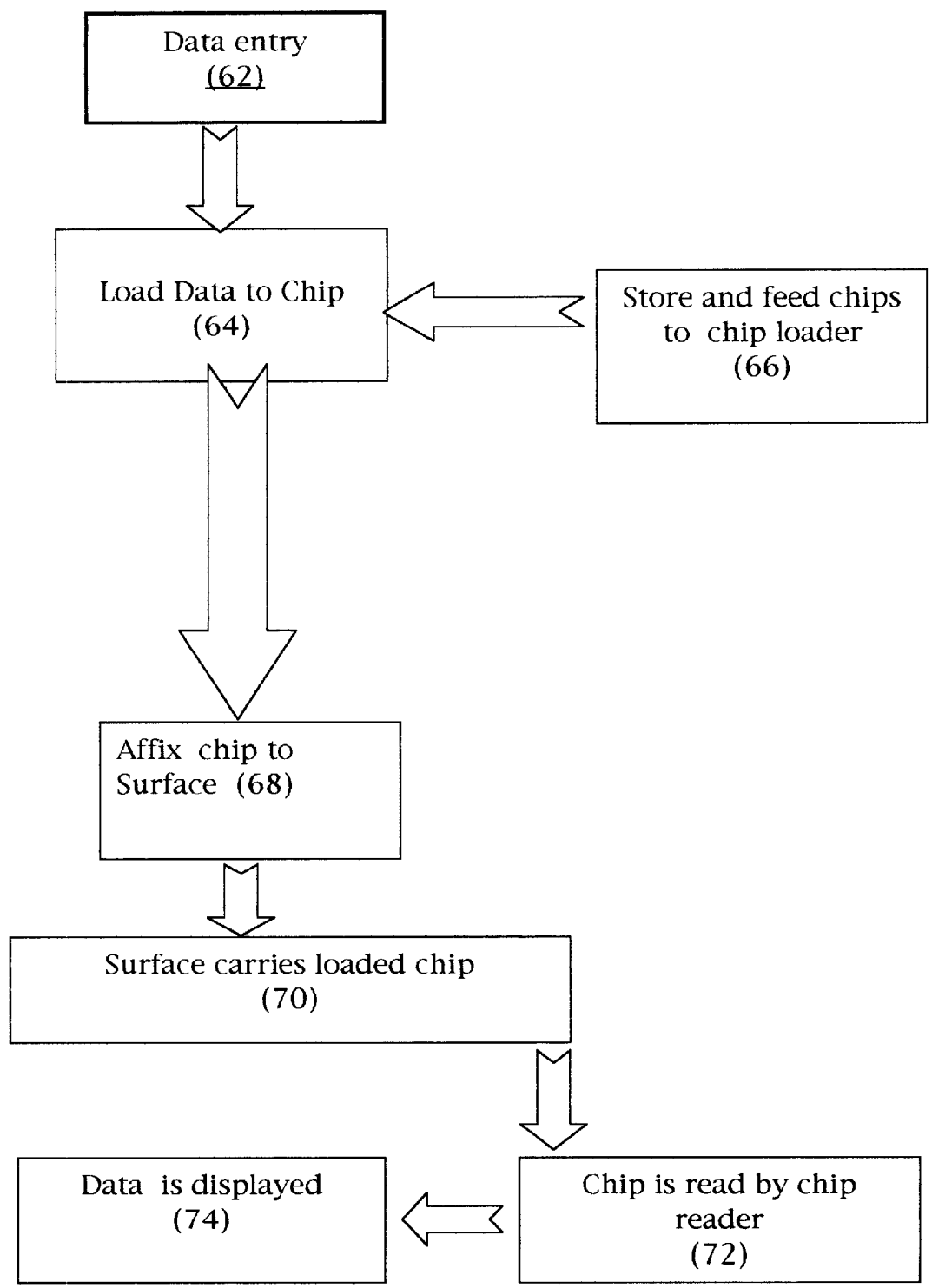

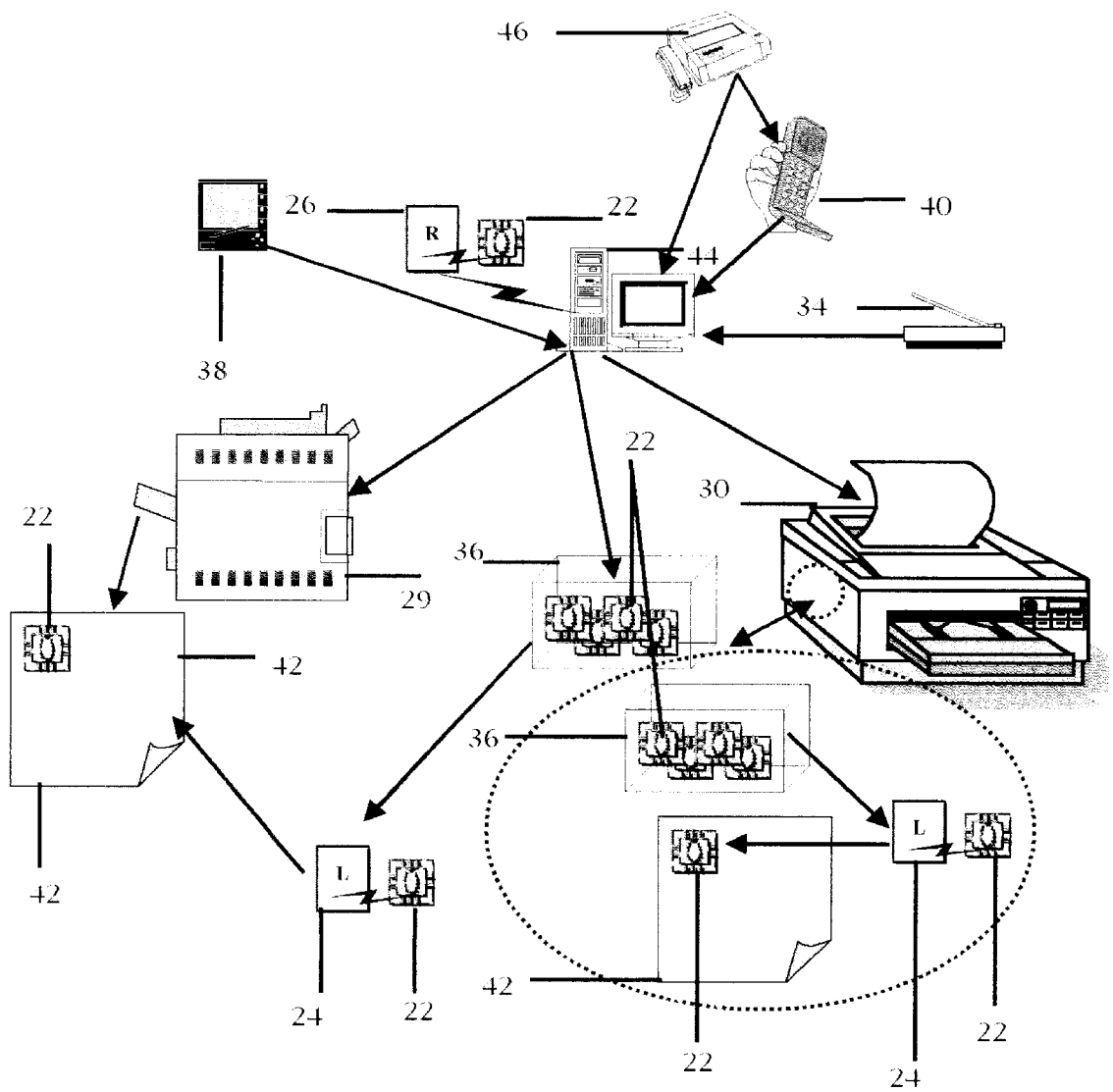

SYSTEM, METHOD AND DEVICES FOR DOCUMENTS WITH ELECTRONIC COPIES ATTACHED THERETO

FIELD AND BACKGROUND OF THE INVENTION

The present invention relates to a system, method and devices for documents with electronic copies attached thereto and, more particularly, to documents bearing an electronic microchip containing a copy of at least a portion of the printed or written document.

One of the important developments resulting from the space program is the electronic microchip. Since their introduction, the use of microchips has become increasingly common. Microchips may be found in devices such as watches, calculators, games, portable telephones and home appliances. There are a wide variety of chips with a range of capabilities, but most relevant to the present invention are chips attached to documents.

U.S. Pat. No. 5,903,869 to Jacobson et al. teaches use of microchips for storing audio data in stick-on chips. Inclusion of visual data is not taught by Jacobson. In addition, the idea that the audio data would match visual data, such as text, of a document is not found in the teachings of this patent.

U.S. Pat. No. 5,936,527 to Isaacman et al. teaches the use of radio frequency broadcasts in conjunction with tags attached to documents as a means of locating specific documents. The idea that data in a tag would match visual data, such as text, of a document is not found in the teachings of this patent.

U.S. Pat. Nos. 5,621,200 and 6,053,405 to Irwin, Jr. et al. teach placement of electronic data on a document for subsequent identification and authentication of a document. Although the use of printed circuits is taught by these patents, the idea that data contained therein would match visual data, such as text, of a document is not found in the teachings of this patent. Teachings of this patent are limited to authentication.

PCT. No. WO 97/33252 to Brosow et al also deals with authentication of documents be means of a register stored in a chip associated with the document. Teachings of this patent are directed primarily at detecting alterations via comparative scanning of foreign bodies placed within the document. The idea that data contained in the chip would match visual data, such as text, of a document is not found in the teachings of this patent. Teachings of this patent are limited to authentication There is thus a widely recognized need for, and it would be highly advantageous to have, a system, method and devices for documents with electronic copies attached thereto devoid of the above limitation.

SUMMARY OF THE INVENTION

According to one aspect of the present invention there is provided a system for producing documents with an electronic copy of at least a portion of the content of the document attached thereto, the system comprises: (a) a microchip, the microchip comprises a memory device capable of storing electronic data and a mechanism for affixation to a document; and (b) a chip loading device capable of placing electronic data corresponding to at least a portion of the document in the memory device of the microchip.

According to another aspect of the present invention there is provided a method for producing documents with an electronic copy of at least a portion of the content of the document attached thereto, the method comprises the step of: (a) storing electronic data in a memory device of a microchip, the microchip including a mechanism for affixation to a document.

According to yet another aspect of the present invention there is provided a writing surface, the writing surface containing a microchip capable of containing an electronic copy of at least a portion of a content of a document printable thereupon.

According to still another aspect of the present invention there is provided a chip reading device for reading an electronic copy of at least a portion of the content of a document attached thereto, the device being integrated into a machine selected from the group consisting of a computer, a personal digital assistant, a telephone, a photocopy machine and a fax machine.

According to an additional aspect of the present invention there is provided a chip loading device capable of placing electronic data corresponding to at least a portion of the content of a document in a memory device of a microchip attachable to the document, the device being integrated into a machine selected from the group consisting of a computer, a printer, a photocopy machine, a scanner and a fax machine.

According to further features in preferred embodiments of the invention described below, the content of the document contains visual data of at least one type selected from the group consisting of text, at least one image, at least one color and at least one texture.

According to still further features in the described preferred embodiments the electronic copy contains at least one data type selected from the group consisting of digital data and analog data.

According to still further features in the described preferred embodiments the electronic copy contains data of at least one type selected from the group consisting of text, at least one image, at least one color, sound and at least one texture.

According to still further features in the described preferred embodiments the system further comprises a chip reading device.

According to still further features in the described preferred embodiments the chip reading device is integrated into a machine selected from the group consisting of a computer, a personal digital assistant, a telephone, a photocopy machine and a fax machine.

According to still further features in the described preferred embodiments the chip loading device is integrated into a machine selected from the group consisting of a computer, a printer, a photocopy machine, a scanner and a fax machine.

According to still further features in the described preferred embodiments the microchip further comprises a status indicator which is readable by an operator of the system.

According to still further features in the described preferred embodiments the method further comprises the step of affixing the microchip to an item selected from the group consisting of the document and a blank writing surface upon which the document may be printed.

According to still further features in the described preferred embodiments the chip loading device is integrated into a machine selected from the group consisting of a computer, a printer, a photocopy machine, a scanner and a fax machine.

According to still further features in the described preferred embodiments the method further comprises the step of reading the electronic data.

According to still further features in the described preferred embodiments the step of reading the electronic data is performed by a machine selected from the group consisting of a computer, a personal digital assistant, a telephone, a photocopy machine, a fax machine and a dedicated chip reader.

According to still further features in the described preferred embodiments the microchip further comprises a status indicator which is readable by a user of the writing surface.

The present invention successfully addresses the shortcomings of the presently known configurations by providing a versatile system, method and devices for documents with electronic copies attached thereto.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a flow diagram of steps in a method according to the present invention, and FIG. 2 is a schematic representation of components of a system according to the present invention.

DESCRIPTION OF THE PREFERRED EMBODIMENTS

The present invention is of a system, method and devices for documents with electronic copies attached thereto which can be used to affix an electronic microchip containing a copy of at least a portion of the printed or written document to the document. Specifically, the present invention can be used to make electronic copies of documents more readily accessible.

The principles and operation of a system, method and devices for documents with electronic copies attached thereto according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of this specification and the accompanying claims the term "content" refers to information including, but not limited to, text, images, colors and textures.

For purposes of this specification and the accompanying claims the term "electronic copy" refers to either a digital copy or an analog copy stored in a machine-readable device, for example a microchip.

For purposes of this specification and the accompanying claims the term "microchip" refers to a machine-writeable and machine-readable device capable of storing electronic data. "Micro", in this case, does not mean that the chip is not visible to the naked eye. Microchip refers to a single microchip as well as to a collection of two or more microchips connected, for example, in series, in parallel, or nested one within another. An example of a microchip suitable for use in the present invention is the Tag-It™ TIRIS™ (Texas Instruments™, U.S.A.). TIRIS™ employs sequential transmission of FM signals and electronic data capture. Primary to each TIRIS™ system are transponders, each of which is especially programmable with a unique code.

TIRIS™ employs radio transmissions to send energy to a transponder which returns a radio transmissions back to a data collection reader. The TIRIS™ transponder (tag) is attachable to or embeddable in objects, such as documents. A TIRIS™ reader-unit sends a radio frequency wave to the tag, and the tag broadcasts its stored data back to the reader. Data collected from a transponder can either be sent directly to a computer, or it can be stored in a reader and later sent to a computer for data processing via a wireless link connecting objects with information management systems.

Referring now to the drawings, FIG. 2 illustrates a system 20 for producing documents 42 with an electronic copy of at least a portion of the content of the document attached thereto. For purposes of this specification and the accompanying claims the term "document" refers to any printed or written item containing visually perceptible data as well as to any data file which may be used to produce such a printed or written item. While a document is typically at least one sheet of paper (as 42 depicts), the definition of document specifically includes, but is not limited to, pages, sheets, labels, boxes, packages, tags, boards, signs and any other item which contains or includes a "writing surface" as defined hereinbelow.

For purposes of this specification and the accompanying claims the phrase "writing surface" specifically includes, but is not limited to, paper, cardboard, acetate, plastic, fabric, metal, wood and adhesive backed materials. Writing surfaces may be supplied, for example, as pre-cut sheets or rolls.

The content of the document may contain, for example visual data including, but not limited to, text, at least one image, at least one color and at least one texture.

The electronic copy may contain, for example, digital data or analog data. This data may be, for example, text, at least one image, at least one color, sound or at least one texture. The data may be present, for example, in a standard file format or a file format unique to system 20. For purposes of this application and the accompanying claims the phrase "standard file format" refers to any format for storing or transmitting electronic data. This definition includes, but is not limited to, Raw File Format, SciTex Continuous Tone, Sun Raster Image, Tagged Image File Format, Truevision Targa, Windows Clipboard, Windows Enhanced Meta File, Windows Meta File, RLE files, Bitmap (.bmp and .wpg), DIB files, Zsoft Paintbrush, Microsoft Paint, Paint Shop Pro Image, .pic files (e.g. PC Paint), Photoshop, Portable Bitmap, Portable Greymap, Portable Network Graphics, Portable Pixelmap, Amiga, Graphics Interchange Format, Deluxe Paint, Dr. Halo, Encapsulated PostScript, FlashPix, GEM paint, JPEG-JFIF Compliant, Macintosh PICT, and Mac Paint.

System 20 includes a microchip 22 which includes a memory device capable of storing electronic data and a mechanism for affixation to a document. For purposes of this specification and the accompanying claims the terms "attached" and "affixed" are defined as physically attached to or in close proximity to. For example, a document pasted to a shipping carton and a microchip pasted to the same shipping carton are considered to be affixed one to the other even though there is no direct physical contact between them. Attachment may be, for example, by embedding, lamination or glueing. Microchip 22 may further include a status indicator which is readable by an operator of the system. Such a status indicator might indicate, for example, whether data has been entered into chip 22, whether the data has been altered, or whether chip 22 is full. Status may be indicated by, for example, a color change or an indicator light.

System 20 further includes a chip loading device 24 capable of placing electronic data corresponding to at least a portion of the document in the memory device of microchip 22. Chip loading device 24 may be, for example, integrated into a machine such as a computer 44, a printer (30 or 29), a photocopy machine, a scanner 34 or a fax machine 46. For purposes of this specification and the accompanying claims the term "computer" includes, but is not limited to, personal computers (PC) having an operating system such as DOS, Windows™, OS/2™ or Linux; Macintosh™, Palm OS™, EPOC™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system; personal digital assistants (PDA), cellular telephones having computer capabilities, a telephone having computer capabilities and Web TVs, each of which is known to include an inherent or connectable display device.

For purposes of this specification and the accompanying claims, the term "Windows™" includes but is not limited to Windows 95™, Windows 2000™ Windows 3.x™ in which "x" is an integer such as "1", Windows NT™, Windows 98™, Windows CE™ and any upgraded versions of these operating systems by Microsoft Corp (USA) and /or window managers for the graphical X Windows system for UNIX based operating systems and/or its variants such as Linux.

For purposes of this specification and the accompanying claims the term "printer" refers to any device which produces a legible copy of data on a writing surface. This definition includes, but is not limited to printers which translate electronic data into printed data, such as those connectable to a computer as defined hereinabove. Further included in this definition are printing presses 29 of all types and sign-making machines.

For purposes of this specification and the accompanying claims the term "photocopy machine" includes, but is not limited to, any device which functions to duplicate documents by processes such as photography or xerography.

For purposes of this specification and the accompanying claims the term "fax machine" includes any device capable of receiving or transmitting an image of a document via a telephone connection (e.g. telephone line, cellular communications network). Specifically included in this definition are computers which function as fax machines.

For purposes of this specification and the accompanying claims the term "scanner" refers to any device capable of generating an electronic image of a document.

According to some preferred embodiments, system 20 further comprises a chip reading device 26. Chip reading device 26 may be integrated into a machine such as, for example, a computer 44, a personal digital assistant 38, a telephone 40, a photocopy machine or a fax machine 46 as defined hereinabove and hereinbelow. Alternately reading device 26 may be a freestanding or dedicated device. For purposes of this specification and the accompanying claims the term "telephone" includes, but is not limited to cellular telephones and smart phones. For purposes of this specification and the accompanying claims the phrase "personal digital assistant" includes, but is not limited to, all devices which have as their operating system Palm OS, GEOS, the EPOC™ operating system of Symbian inc., the Pocket PC™ operating system or Windows CE™ or Windows Powered operating systems of Microsoft inc. and the Newton OS™ of Apple Computing inc.

The present invention is further embodied by a method 60 (FIG. 1) for producing documents 42 with an electronic copy of at least a portion of the content of the document attached thereto, the method comprises the step of storing electronic data in a memory device of microchip 22 which includes a mechanism for affixation 68 to document 42 or a writing surface 70. Storing of data may involve data capture or data entry 62 and chip loading 64. Chips may be stored and fed 66 to chip loader 24 as part of method 60. This storage and feeding may occur either within a device (e.g., printer 30, as indicated by dotted oval) or as a separate process. Data capture may be accomplished, for example, from a chip 22 via a chip reader 26 and computer 44, from a PDA 38 and computer 44, from a phone 40 and computer 44, scanner 34 and computer 44, or via a fax machine 46. Method 60 may further include the step of affixing microchip 22 to an item such as, for example, document 42 or a blank writing surface upon which document 42 may be printed. Method 60 may further include the step of reading 72 the electronic data. Reading 72 may result in data display 74, for example by printing or display on a computer monitor or transmission of a fax message. Reading 72 the electronic data may be performed, for example, by a machine selected from the group consisting of computer 44, a personal digital assistant 38, telephone 40, a photocopy machine, a fax machine 46 and a dedicated chip reader 26.

The present invention is further embodied by a writing surface containing microchip 22 capable of containing an electronic copy of at least a portion of a content of document 42 printable thereupon.

The present invention is further embodied by a chip reading device 26 for reading an electronic copy of at least a portion of the content of document 42 attached thereto. Device 26 may be, for example, integrated into a machine including but not limited to computer 44, personal digital assistant 38, telephone 40, a photocopy machine or a fax machine 46.

The present invention is further embodied by a chip loading device 24 capable of placing electronic data corresponding to at least a portion of the content of a document in a memory device of a microchip attachable to the document, the device being integrated into a machine selected from the group consisting of a computer 44, a printer (30 or 29), a photocopy machine, a scanner 34 or a fax machine 46.

The present invention relies in large part upon commercially available devices and components assembled in novel combinations to provide added functionality to a document or to existing devices. One ordinarily skilled in the art will be capable of assembling the required novel combinations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for producing documents with an electronic copy of a content of the document attached thereto, the system comprising:

(a) a microchip, said microchip comprising a memory device capable of storing electronic data and a mechanism for affixation to a document and further comprising a status indicator which is readable by an operator of the system; and (b) a chip loading device capable of placing electronic data corresponding said content of the document in said memory device of said microchip.

2. The system of claim 1, wherein the content of the document contains visual data of at least one type selected from the group consisting of text, at least one image, at least one color and at least one texture.

3. The system of claim 1, wherein the electronic copy contains at least one data type selected from a group consisting of digital data and analog data.

4. The system of claim 1, wherein the electronic copy contains data of at least one type selected from a group consisting of text, at least one image, at least one color, sound and at least one texture.

5. The system of claim 1, further comprising:

(c) a chip reading device.

6. The system of claim 5, wherein said chip reading device is integrated into a machine selected from a group consisting of a computer, a personal digital assistant, a telephone, a photocopy machine and a fax machine.

7. The system of claim 1, wherein said chip loading device is integrated into a machine selected from a group consisting of a computer, a printer, a photocopy machine, a scanner and a fax machine.

8. A writing surface, said writing surface containing a microchip capable of containing an electronic copy of said content of a document printable thereupon and further comprising a status indicator which is readable by a user of the writing surface.

9. The writing surface of claim 8, wherein said content of said document contains visual data of at least one type selected from a group consisting of text, at least one image, at least one color and at least one texture.

10. The writing surface of claim 8, wherein said electronic copy contains at least one data type selected from a group consisting of digital data and analog data.

11. The writing surface of claim 8, wherein said electronic copy contains data of at least one type selected from a group consisting of text, at least one image, at least one color, sound and at least one texture.

* * * * *